(12) United States Patent
Fujino

(10) Patent No.: US 7,233,481 B2
(45) Date of Patent: Jun. 19, 2007

(54) ELECTRIC DOUBLE LAYER CAPACITOR AND ELECTROLYTE SOLUTION THEREFOR

(75) Inventor: Takeshi Fujino, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/043,408

(22) Filed: Jan. 27, 2005

(65) Prior Publication Data

US 2005/0162813 A1   Jul. 28, 2005

(30) Foreign Application Priority Data

Jan. 28, 2004   (JP) ............................. 2004-019690
May 12, 2004   (JP) ............................. 2004-142220

(51) Int. Cl.
*H01G 9/00*   (2006.01)
(52) U.S. Cl. .................. 361/502; 361/503; 361/504; 361/508; 361/512
(58) Field of Classification Search ........ 361/502–504, 361/508–512, 516, 519, 523–534
See application file for complete search history.

(56) References Cited

U.S. PATENT DOCUMENTS

| | | | | |
|---|---|---|---|---|
| 5,973,913 A | * | 10/1999 | McEwen et al. ............ | 361/523 |
| 6,573,004 B1 | * | 6/2003 | Igarashi et al. ............ | 429/217 |
| 6,574,092 B2 | * | 6/2003 | Sato et al. .................. | 361/502 |
| 6,580,599 B2 | * | 6/2003 | Matsuo ...................... | 361/504 |
| 6,660,583 B2 | * | 12/2003 | Fujino et al. .............. | 438/253 |
| 6,733,544 B2 | * | 5/2004 | Takasugi et al. ........... | 29/25.03 |
| 6,939,453 B2 | * | 9/2005 | Anderson et al. .......... | 204/469 |
| 2003/0139009 A1 | | 7/2003 | Fujino et al. | |
| 2003/0202316 A1 | * | 10/2003 | Kawasato et al. ......... | 361/502 |

FOREIGN PATENT DOCUMENTS

| | | | |
|---|---|---|---|
| EP | 381 936 A1 | | 8/1990 |
| JP | 63-4569 | | 1/1988 |
| JP | 05308038 | | 11/1993 |
| JP | 07078632 A | * | 3/1995 |
| JP | 7-283083 | | 10/1995 |
| JP | 8-236404 A | | 9/1996 |
| JP | 8-250378 A | | 9/1996 |
| JP | 8-273936 A | | 10/1996 |
| JP | 2000-150317 A | | 5/2000 |
| JP | 2000-208372 A | | 7/2000 |
| JP | 3156546 B2 | | 2/2001 |
| JP | 2001-217150 A | | 8/2001 |

* cited by examiner

*Primary Examiner*—Nguyen T. Ha
(74) *Attorney, Agent, or Firm*—Arent Fox LLP

(57) ABSTRACT

An electric double layer capacitor has a pair of activated carbon electrodes and an organic solution in which an electrolyte is dissolved in an organic solvent. An electrolyte solution is also provided. In the electric double layer capacitor, at least one of cycloalkane, cycloalkene, or derivatives thereof is contained in at least one of the activated carbon and the organic electrolyte solution. The organic solvent contains a main solvent and an additive solvent. The main solvent contains propylenecarbonate in a range of from 99.9 to 70 wt %, and at least one of ethylenecarbonate and dimethylcarbonate in a range of from 0.1 to 30 wt %, and the additive solvent contains cycloalkane in a range of from 5 to 30 wt % to the total amount of the organic solvent.

8 Claims, 2 Drawing Sheets

ELECTRIC DOUBLE LAYER CAPACITOR AND ELECTROLYTE SOLUTION THEREFOR

BACKGROUND OF INVENTION

1. Technical Field

The present invention relates to electric double layer capacitors having large capacity and high power, and in particular, relates to a technique to prevent decomposition of the electrolyte solution used in the capacitor.

2. Background Art

An electric double layer capacitor has characteristics such as long service life, high cycling characteristics, and characteristics of charge and discharge with large current since there are no chemical reactions during charge and discharge of the capacitor as there are in a conventional secondary battery. Therefore, this type of capacitor is attracting much attention as a new type of storage battery or as a driving power supply for automobiles and devices. In particular, electric double layer capacitors having large capacity and high power are being developed.

As an example of such an electric double layer capacitor, a button-type electric double layer capacitor is shown in FIG. 1. As shown in FIG. 1, the capacitor 1 includes a case 2, a pair of polarizing electrodes 3 and 4 contained in the case 2, a spacer 5 disposed between the electrodes, and electrolyte solution filled in the case 2. The case 2 comprises an aluminum body 7 having an opening part 6 and an aluminum cover plate 8 which closes the opening part 6. A part between the outer circumference of the cover plate 8 and inner circumference of the body 7 is sealed with a sealing material 9. The polarizing electrodes 3 and 4 comprise a mixture of an activated carbon for an electrode, conductive filler, and binder.

Conventionally, as the electrolyte solution used as a material of the electric double layer capacitor, a water-based electrolyte solution and a non-water-based electrolyte solution can be mentioned. In particular, since high voltage use is required to improve energy density of the electric double layer capacitor, the non-water-based electrolyte solution which can be charged and discharged at relatively high voltage has been widely used. As the non-water-based electrolyte solution, the solution in which various conditions such as low-temperature property, solubility of salt, dielectric constant, safety, electrolyte solution decomposition property, boiling point, cost and the like is improved is required. As a material which meets these requirements, an electrolyte solution in which propylene carbonate is mainly used as a solvent and a quaternary ammonium salt is added as a supporting salt, may be mentioned.

However, in the electric double layer capacitor having an electrolyte solution containing propylene carbonate and an alkali activated carbon, in the case in which it is charged and discharged repeatedly under high voltage, the electrolyte solution is gradually decomposed by an electric current and gas is generated. The inner pressure of the capacitor is increased by the gas generation, and the capacitor case may be deformed or broken. Furthermore, as a result of consumption of the electrolyte solution by the electrolysis, capacitance may be deteriorated and internal resistance may be increased. Furthermore, the viscosity of the electrolyte solution in the conventional capacitor is increased at low temperatures, and the property of charging and discharging at low temperatures may be deteriorated.

To solve such problems, a method in which various types of materials are added to reduce decomposition of the electrolyte solution, a method to reduce internal resistance, and the like have been suggested. Practically, a method in which a fluorine substituted type carbonic acid ester is added to a electrolyte solution having an organic carbonate as a solvent, and support salt (see Japanese Unexamined Patent Application Publication No. 2000-150317) and a method in which γ-butyrolactone or γ-valerolactone is added (see Japanese Unexamined Patent Application Publication No. 2001-217150) have been disclosed. Furthermore, a low viscosity solvent, for example, a chain carbonate such as dimethylcarbonate, ethylmethylcarbonate or the like, an aliphatic monocarboxylic acid ester such as γ-butyrolactone, γ-valerolactone or the like (see Japanese Unexamined Patent Application Publication No. Hei 8-236404, No. Hei 8-273936), a solvent in which ethylenecarbonate is mixed with propylenecarbonate (see Japanese Unexamined Patent Application Publication No. 2000-208372) have been suggested.

However, in the technique disclosed in No. 2000-150317, the fluorine substituted type carbonic acid ester is expensive. In the technique disclosed in No. 2001-217150, the effect of restraining decomposition of the electrolyte solution by γ-butyrolactone or γ-valerolactone is insufficient. In addition, the two techniques had been completed depending on assumption of efficiency improvement at high temperatures; therefore, improvement of charging and discharging property at low temperatures is not sufficient. Furthermore, in the solvents disclosed in No. Hei 8-236404, No. Hei 8-273936, and No. 2000-208372, internal resistance of the capacitor is improved; however, reduction of gas generation is not sufficient, the same amount or a greater amount of gas is generated compared to the case of a conventional propylene carbonated solvent.

SUMMARY OF THE INVENTION

The present invention was completed in view of the above-described circumstances, and an object of the present invention is to provide an electrolyte solution for electric double layer capacitors in which internal resistance is reduced, decomposition of the electrolyte solution in use of high voltage is restrained, and charging and discharging property at low temperature is improved, and to provide an electric double layer capacitor therefor.

The inventors had researched regarding materials added to electrolyte solutions, and it became obvious that the reducing effect of gas generation can be obtained by adding a certain organic material to an electrolyte solution of a capacitor. That is, an electric double layer capacitor of the present invention has a pair of activated carbon electrodes, an organic electrolyte solution in which electrolytes are dissolved in an organic solvent, and at least one selected from cycloalkane, cycloalkene and derivatives thereof in at least one of activated carbon electrodes and an organic electrolyte.

Since the electric double layer capacitor of the present invention has a material selected from cycloalkane, cycloalkene and derivatives thereof in at least one of activated carbon electrodes and organic electrolyte, decomposition of the organic electrolyte solution can be restrained. Furthermore, since the viscosity of the electrolyte solution can be reduced by adding the organic materials, charging and discharging property at low temperature can also be improved compared to a conventional electrolyte solution.

Furthermore, another electric double layer capacitor of the present invention has a pair of activated carbon electrodes and an organic electrolyte solution in which an electrolyte is dissolved in an organic solvent, and the organic solvent has a main solvent and an additive solvent. The main solvent includes propylenecarbonate in a range of from 99.9 to 70 wt %, at least one of ethylenecarbonate and dimethylcarbonate in a range of from 0.1 to 30 wt %, and the additive solvent includes cycloalkane in a range of from 5 to 30 wt % to a total amount of solvent.

In the electric double layer capacitor of the present invention, since at least one of ethylenecarbonate and dimethylcarbonate is added to an electrolyte solution mainly containing propylenecarbonate, electrolysis reaction of propylenecarbonate is inhibited by the at least one of ethylenecarbonate and dimethylcarbonate, and as a result, gas generation by the decomposition of the electrolyte solution can be restrained. Furthermore, since cycloalkane is added in the electrolyte solution of the present invention, cycloalkane is preferentially absorbed on the surface of activated carbon to restrain the decomposition reaction of propylene carbonate.

As explained above, by the electric double layer capacitor of the present invention, decomposition of the electrolyte solution is restrained even when a high voltage is used, internal resistance is reduced, and furthermore, charging and discharging property at low temperatures is improved.

EMBODIMENT OF THE INVENTION

Figure 1:
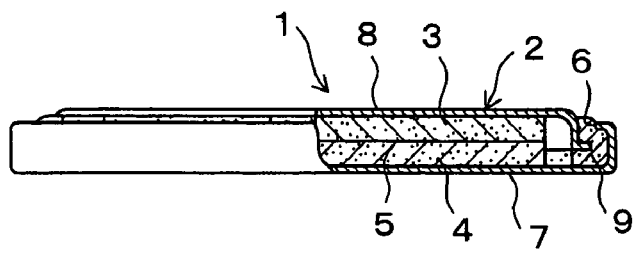
FIG. 1 is a partial cross sectional drawing of a button type electric double layer capacitor which is an example of an electric double layer capacitor.
Figure 2:
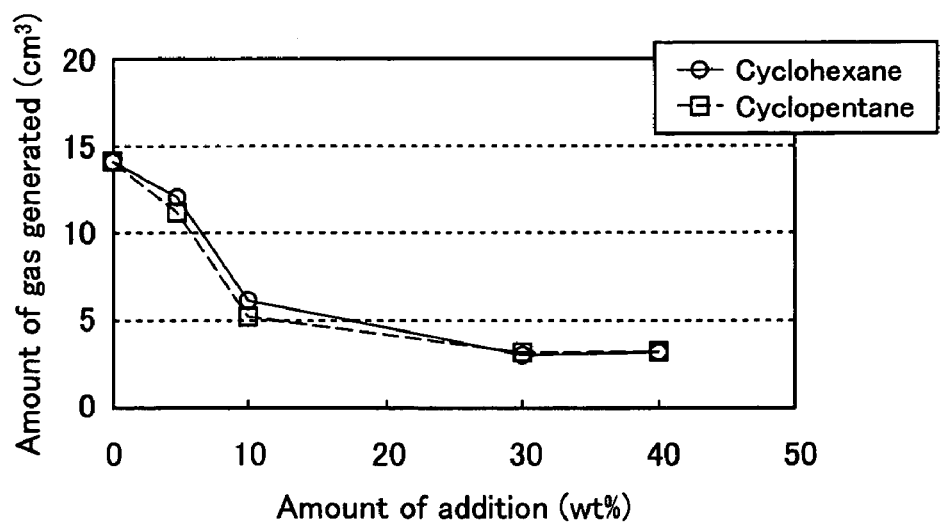
FIG. 2 is a graph showing a relationship of the added amount of cycloalkane and the generated amount of gas in the electrolyte solution of the Examples and Comparative Examples of the present invention.

A preferred embodiment of the electric double layer capacitor and the electrolyte solution therefor of the present invention are explained below.

A conventional electric double layer capacitor having alkali activated carbon as a polarizing electrode and propylenecarbonate as an electrolyte solution has a problem of gas generation due to decomposition of the electrolyte solution as described above. As a result of research on activated carbon properties and electrolyte solutions performed by the inventors, it became clear that a device having an anode and a cathode each made of an activated carbon electrode and facing each other in which at least one selected from cycloalkane, cycloalkene, or derivatives thereof shown in Chemical Formulas 1 to 4 is contained, can overcome the above-mentioned problems. As such an organic compound, practically, cyclohexane, cyclopentane or the like can be mentioned.

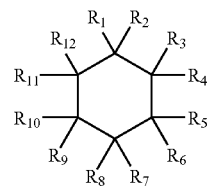

Chemical Formula 1

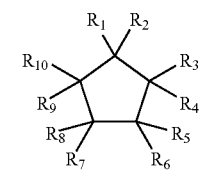

Chemical Formula 2

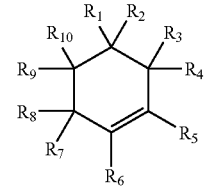

Chemical Formula 3

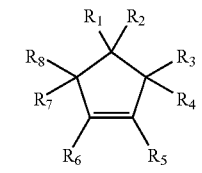

Chemical Formula 4

Chemical Formula 1 shows cyclohexane and its derivatives, Chemical Formula 2 shows cyclopentane and its derivatives, Chemical Formula 3 shows cyclohexene and its derivatives, and Chemical Formula 4 shows cyclopentene and its derivatives. Groups $R_1$ to $R_{12}$ are hydrogen, chlorine, fluorine, bromine, oxygen, and hydrocarbon groups having a carbon number from 1 to 6. Practically, monofluorocyclohexane, monochlorocyclohexane, monofluorocyclopentane, monochlorocyclopentane, cyclopantanone or the like can be mentioned. In the case in which the groups $R_1$ to $R_{12}$ are hydrocarbon groups, it is desirable that the carbon number be 3 or less, and practically, methylcyclohexane, dimethylcyclohexane, ethylcyclohexane, 1,3-ethylmethylcyclohexane, methylcyclopentane, dimethylcyclopentane, ethylcyclopentane, 1,3-ethylmethylcyclopentane or the like can be mentioned. To improve mix solubility with a solvent component of a main component, these additives can be mixed.

The amounts of these organic materials added to the electrolyte solution are decided depending on mixing solubility of the added organic material and the electrolyte solution. Therefore, in spite of there being a variation depending on kind of organic material added, it can be added in a range of from 1 to 90 wt %. It is desirable that 5 wt % or more be added since significant effect is exhibited in the case in which the added amount is 5 wt % or more, and in particular, a range of 5 to 40 wt % is desirable in practical use. The range of 10 to 40 wt % is more desirable. There are several reasons for this. First, many of the additives and derivatives thereof of the present invention have a boiling point in a range of from about 50 to 150° C. Therefore, if the added amount is increased, vapor pressure after mixing is increased and the internal pressure of the capacitor is also increased. Second, if the content of cycloalkanes and derivatives thereof are increased, an electrolyte solution mainly containing carbonate is separated, and a uniform electrolyte solution is difficult to prepare. Furthermore, since solubility of salt in electrolytes is decreased if the added amount is increased at low temperature, the salt may precipitate or separate, reducing ion conductivity.

It is desirable that the electrolyte solution be mixed and dispersed without being separated in practical use. However, it is not necessary to be mixed and dispersed to obtain the effect of gas reduction. Furthermore, addition of the organic material of the present invention is especially effective in a combination of carbonaceous material and non-water based electrolyte solution, and in particular to an electrolyte solution mainly containing propylenecarbonate.

These organic materials need to be contained in an activated carbon or in an electrolyte solution. As a method of introducing the organic material, gas in a device is removed by vacuum degassing and the organic material in a gas state is introduced to the inside of the activated carbon, or the device is immersed in an electrolyte solution containing the organic material, and a voltage is applied to produce an electric double layer capacitor.

Furthermore, it is especially effective for at least one selected from cycloalkane, cycloalkene, and derivatives thereof to exist only in the activated carbon of the negative electrode. This is because the surface of the activated carbon of the positive electrode is not a cause of propylenecarbonate decomposition, and these derivatives other than cyclohexane and cyclopentane may cause oxidation decomposition of the organic material itself, increasing the gas generation. In practice, a method in which the organic material is absorbed only in the activated carbon of the negative electrode and the electrode is immersed in the electrolyte solution, is efficient.

In this embodiment, it is assumed that absorption of cycloalkane having low viscosity into fine pores of the activated carbon electrode having high reactivity may reduce the PC decomposition. Therefore, an activated carbon having a large number of fine pores and low specific area less than 1000 $m^2/g$, in particular, an activated carbon having a specific area in a range of from 100 to 800 $m^2/g$ exhibits an effect of reducing decomposition sufficiently. It is desirable that the viscosity of the cycloalkane at 25° C. be less than 2.5 cp (25° C.) which is the viscosity of the main solvent PC, and in particular an organic liquid having low viscosity less than 2 cp is desirable.

As a result of research performed by the inventors, in the case in which the elements O, N, S or the like which gives a polar structure is contained in a ring structure, the added organic material may be decomposed undesirably. Furthermore, a chain hydrocarbon such as n-hexane or the like is undesirable since it reduces the property of the capacitor more than cycloalkane does. Therefore, in the present invention, non-polar or low-polar cycloalkanes are desirable.

Furthermore, desirable molecular structures can be obtained by modifying them from the viewpoints of dielectric constant, boiling point, melting point, and ignition point. In practice, considering mixing properties with carbonates, optimization can be performed by preparing cycloalkyne in which carbon-carbon unsaturated bonding is contained in part of cycloalkane, or by preparing a derivative in which a substituent is introduced to a side chain of cycloalkane. However, in the case in which the carbon-carbon unsaturated bonding is contained, that is, cycloalkyne, gas reducing effect is inferior since cycloalkyne is easier to decompose than cycloalkane.

The inventors further researched and discovered that the amount of gas generated can be further reduced, having almost no deleterious effect on the other properties, by adding a small amount of ethylenecarbonate and/or dimethylcarbonate to the propylenecarbonate and further adding cycloalkane. In this embodiment, not only can the amount of gas be reduced, but also the internal resistance can be reduced and low temperature property can be improved. This embodiment is more desirable than the conventional propylenecarbonate single solvent from many viewpoints.

As a result of researching about the composition ratio of ethylenecarbonate or dimethylcarbonate to propylenecarbonate, desirable reducing effect of gas generation can be obtained in a range of from 0.1 to 30 wt %, in particular, in a range of from 2 to 10 wt %. If the added amount is more than 30 wt %, the amount of gas generated is undesirably increased.

Practical examples of the cycloalkane which are added to the mixed solvent of propylenecarbonate and ethylenecarbonate or the mixed solvent of propylenecarbonate and dimethylcarbonate in the electric double layer capacitor of the present invention are shown in above mentioned Chemical Formulas 1 and 2.

In this embodiment, the amount of cycloalkane added to the electrolyte solution is decided depending on the mixture solubility of the electrolyte solution and added cycloalkane. Therefore, in spite of there being a variation depending on kind of organic material added, addition of 1 wt % or more to the electrolyte solution (the total amount of the solvent) is effective, and addition in a range of from 5 to 30 wt % is particularly effective. The reason why ratio of amount added is decided in this range is described in the first embodiment of the present invention above.

Also in this embodiment, it is desirable that the electrolyte solution be mixed and dispersed without being separated in practical use. However, it is not necessary to be mixed and dispersed to obtain effect of gas reduction since the additive is absorbed in the activated carbon. Furthermore, addition of the organic material of the present invention is especially effective for a combination of carbonaceous material and non-water-based electrolyte solution, and in particular to an electrolyte solution mainly containing propylenecarbonate.

The reason why the properties of the electrolyte solution of this embodiment are improved is not certainly known, but it is assumed to be as follows. Conventionally, in a case in which a single solvent of propylenecarbonate, ethylenecarbonate, or dimethylcarbonate is used in fine pores of alkali activated carbon under high voltage and temperature, the solvent is decomposed to generate CO and $CO_2$. In the present invention, since a similar carbonate having a carbon number of 3 or less such as ethylenecarbonate or dimethylcarbonate is added in a small amount to a propylenecarbonate having a carbon number of the alkyl group is 3, an interaction occurs between propylenecarbonate and ethylnecarbonate or between propylenecarbonate and dimethylcarbonate, and as a result, reactivity of propylenecarbonate is reduced. Practically, coexistence effects between these solvents, that is, reaction between propylencarbonate and ethylenecarbonate or between propylenecarbonate and dimethylcarbonate makes a reaction product, and the product reduces the initial decomposition amount of propylenecarbonate.

A reason why an appropriate mixed amount of at least one of ethylenecarbonate and dimethylcarbonate to propylenecarbonate is in a range of from 0.1 to 30 wt % is assumed to be as follows. Since ethylenecarbonate has a larger solvation energy with a cation than propylenecarbonate and since dimethyl carbonate has low viscosity and small molecular size, they are preferentially absorbed into fine pores which may be starting points of gas generation. Since ethylenecarbonate and dimethylcarbonate are absorbed preferentially, the composition ratio of propylenecarbonate and ethylenecarbonate or composition ratio of propylenecarbonate and dimethylcarbonate near the surface of the activated carbon becomes about 1:1, decomposition of propylenecarbonate is effectively restrained.

In the case in which ethylenecarbonate or dimethylcarbonate is less than 0.1 wt %, the amount thereof in the fine pores is too small compared to propylenecarbonate, and the reaction product is not generated. In the case in which ethylenecarbonate is more than 30 wt % or in the case in which dimethylcarbonate is more than 50 wt %, amount of propylenecarbonate in the fine pores is too small, the coexistence effect is reduced, and as a result, ethylenecarbonate or dimethylcarbonate is decomposed, increasing gas generation. In particular, since ethylenecarbonate is easy to decompose compared with propylene carbonate, gas generation is particularly increased depending on the added amount.

As a suggestion of this assumption, internal resistance of a cell in the Examples is reduced by merely adding about 1 wt % of ethylenecarbonate. This shows the internal resistance is reduced since ethylenecarbonate having lower viscosity is absorbed in the fine pores, and similar reason can be assumed about dimethylcarbonate.

Considering the above-mentioned facts, it can be thought that the effect can be obtained by adding a carbonate, having a smaller carbon number except for its carbonate structure, to the main solvent. Practically, since propylene carbonate has a carbon number of 3 except for the carbonate structure, the effect can be obtained by adding ethylenecarbonate or dimethylcarbonate which has a carbon number of 2. A similar effect can be obtained by adding ethylmethylcarbonate which has a carbon number of 3. Furthermore, in the case in which butylenecarbonate having a carbon number of 4 is used as a main solvent, propylenecarbonate and ethylmethylcarbonate having a carbon number of 3, and ethylenecarbonate and dimethylcarbonate having a carbon number of 2 is mixed to obtain the effect.

A reason why the properties are improved by adding cycloalkane is assumed to be as follows. Cycloalkane is preferentially absorbed on the surface of activated carbon to inhibit reaction of propylenecarbonate which is a main solvent. As a result, the amount of gas generated is reduced, and the possible range of voltage of the electric double layer capacitor increases.

In this embodiment, it is assumed that absorption of cycloalkane having low viscosity into fine pores of the activated carbon electrode having high reactivity may reduce the propylenecarbonate decomposition. Therefore, an activated carbon having a large number of fine pores and low specific area less than 1200 $m^2/g$, in particular, an activated carbon having a specific area in a range of from 100 to 1200 $m^2/g$ exhibits an effect of reducing decomposition sufficiently. It is desirable that the viscosity of cycloalkane at 25° C. be less than 2.5 cp (25° C.) which is a viscosity of the main solvent propylenecarbonate, and in particular an organic liquid having low viscosity less than 2 cp is desirable.

As a result of research performed by the inventors, a chain hydrocarbon such as n-hexane or the like is undesirable since it reduces the property of the capacitor more than cycloalkane does. Therefore, in the present invention, non-polar or low-polar cycloalkanes are desirable.

Furthermore, desirable molecular structures can be obtained by modifying them from the viewpoints of dielectric constant, boiling point, melting point, and ignition point. In practice, considering mixing property with carbonates, optimization can be performed by preparing cycloalkene or cycloalkyne in which carbon-carbon unsaturated bonding is contained in part of cycloalkane, or by preparing a derivative in which a substituent is introduced to a side chain of cycloalkane. However, in the case in which the carbon-carbon unsaturated bonding is contained, gas reducing effect is inferior since it is easier to decompose than cycloalkane.

Other constitutional elements of the electric double layer capacitor of the present invention are further explained below.

1. Activated Carbon Electrode

A carbonaceous material for an activated carbon electrode in the present invention is not particularly limited. In particular, mesophase pitch, distillation pitch such as ones which are petroleum oil based or coal based, coke containing the pitch, needle coke, chemically synthesized pitch, PVC pitch, or the like is desirable. By alkali activating these carbonaceous materials, activated carbon which is used in the present invention is obtained. In spite of there being a variation in appropriate added ratio depending on properties and fine pore size of activated carbon, since the ratio of propylenecarbonate, ethylenecarbonate, and dimethylcarbonate varies depending on the size of the fine pores of the activated carbon, it is desirable to use an activated carbon having a specific surface area in a range of from 100 to 3000 $m^2/g$, and more desirably in a range of from 100 to 1200 $m^2/g$. However, assuming from the mechanism of restraining of gas generation, the effect of the present invention is not limited by kind and properties of the activated carbon. Phenol, coconut husk, petroleum oil or coal can be used as a carbonaceous material, and water vapor activation or chemical activation can be performed. In particular, an activated carbon having a graphite structure which is developed into a crystal structure, and having lower specific surface area, has a strong effect of restraining gas generation. In Example of the present invention, graphite carbon material obtained by performing heat treatment of pitch is activated by potassium hydroxide and washed to obtain activated carbon.

2. Electrolyte Solution

There is no particular limitation of the electrolyte solution and any kind of electrolyte solution can be used as long as the solution does not inhibit the effect of the organic material added in the present invention. As an electrolyte used in the solution, from the viewpoints of electrical conductivity, solubility, and electrochemical stability, a salt having the following cation and anion disclosed in Japanese Unexamined Patent Application Publication No. Hei 08-250378 is desirable. As such a cation, quaternary ammonium cation, pyrrolidinium cation such as dimethyl pyrrolidinium, methylethyl pyrrolidinium, diethyl pyrrolidinium or the like, ionic liquid such as alkyl imidazolium such as ethylmethyl imidazolium or the like can be mentioned, and as such an anion, $BF_4^-$, $PF_6^-$, $CF_3SO_3^-$, $AsF_6^-$, $N(SO_2CF_3)_2^-$ or the like can be mentioned.

It is desirable that the concentration of salt in the electrolyte solution be in a range of from 0.8 to 6.0 mol/L to maintain an ion amount necessary to form an electric double layer, and to obtain sufficient electrical conductivity. These electrolytes can be used alone or in a mixture of several kinds. As a polar solvent, cyclic carbonates such as ethylenecarbonate, propylenecarbonate, butylenecarbonate or the like, straight chain carbonates such as dimethylcarbonate, ethylmethylcarbonate, diethylcarbonate or the like, sulfur-containing organic compounds such as sulfolane, 3-methyl-sulfolane, ethylene sulfite can be mentioned. A carbonate derivative of these solvents containing substituants such as chlorine or fluorine can be used. The polar solvent used in the present invention can be used alone, or in a mixture as disclosed in Japanese Patent No. 3156546.

3. Capacitor Cell Case

For the case for the electric double layer capacitor of the present invention, one of any shape, such as a cylinder, cube, or cuboid can be used. In the case in which cylindrical case is used, positive and negative electrodes are formed on both surfaces of a collector sheet, the collector sheet is rolled with a separator, and is put in a cylindrical case. In such a rolled-type device structure, the size of the device can be freely changed by controlling the width and length of the electrodes. Furthermore, by rolling strongly, the electrodes in the device can be compressed and the filled ratio of activated carbon can be improved. This cylindrical cell has an improved energy density per volume Wh/L.

In the case in which a cubic or cuboid case is used, electrodes are stacked and inserted into the case. In this case, the volume efficiency of the capacitor module in which plural cells are connected can be improved compared to the cylindrical case.

As a material of the case in which the device is inserted, any kind of material can be used; however, volume change during charging and discharging of less than 1% is desirable, and practically, Al, Ti, Mg, Fe, Cr, Ni, Mn, Ca, Zr, or an alloy containing at least one of these metals can be used.

EXAMPLES

The present invention is further explained by way of Examples.

Examples 1 to 10 and Comparative Example 1

Preparation of Electrode

Activated carbon having an average particle diameter of 15 μm obtained by alkali activating a carbonated material of mesophase pitch by KOH (specific surface area: 790 m$^2$/g, micropore fine pore volume by t-plot method: 0.34 ml/g, and amount of surface functional group by titration method: 0.7 meq/g), Denkablack (conductive filler), and polytetrafluoroethylene (PTFE, binder) were weighed in a ratio 90:5:5 and mixed. This mixture was rolled to form an electrode sheet having a forming density of 0.85 g/cm$^3$ and a thickness of 150 μm.

Preparation of Electrolyte Solution

Cyclohexane was contacted to a molecular sieve which was preheated and dried, to remove water until less than 30 ppm remained. Cyclohexane was mixed with a 1.5 mol/L propylene carbonate solution of triethylmethylammonium tetrafluoroborate [$(C_2H_5)_3CH_3NBF_4$], and electrolyte solutions of Examples 1 to 4 having composition ratio of cyclohexane of 5 wt %, 10 wt %, 30 wt %, and 40 wt % were prepared.

Electrolyte solutions of Examples 5 to 8 having composition ratio of cyclopentane of 5 wt %, 10 wt %, 30 wt %, and 40 wt % were prepared in a similar way as in the above-mentioned way except for using cyclopentane instead of cyclohexane. Electrolyte solution of TEMABF4/PC having no cyclohexane and cyclepentane was used as Comparative Example 1.

Preparation of Capacitor Cell (Examples 1 to 8 and Comparative Example 1)

The activated carbon electrode sheets obtained above were arranged on both surfaces of rectangular collector sheets of aluminum foil by a conductive adhesive. In this way, a positive electrode and a negative electrode were prepared, and these electrodes were rolled with a separator to prepare a device. This device was inserted into an Al cylindrical case having diameter of 40 mm and length of 120 mm so that no space was formed between the case and the device. A terminal part was welded to seal it, and a capacitor cell was obtained. It should be noted that this capacitor cell had a hole by which the electrolyte solution could be filled therein.

The capacitor cell was dried in a vacuum, and the electrolyte solution of Example 1 was filled in this cell. Then, the reducing of pressure and filling of the electrolyte solution were repeated to soak the activated carbon electrode in the electrolyte solution sufficiently. After that, an aging treatment of applying a constant voltage of 2.7 V was performed for 6 hours at 65° C. The temperature of the cell was decreased to room temperature, the electrolyte solution of Example 1 was filled in the cell again, the amount of space in the cell was a predetermined amount, and the hole was sealed by a plug. Constant current discharging of 30 A was performed by an energy equivalent method, and initial efficiency (initial capacitance of the capacitor) was measured. Furthermore, using the electrolyte solution of Examples 2 to 8 and Comparative Example 1, capacitor cells of Examples 2 to 8 and Comparative Example 1 were prepared in a similar manner as described above, and initial efficiencies were measured.

Preparation of Capacitor Cell (Example 9)

The cylindrical capacitor cell similar to the above-mentioned cell was dried in a vacuum at 200° C. and the temperature was decreased to 25° C. The cell was put in a glove box, and the inside pressure of the cell was reduced by a rotary pump and cyclopentane gas was introduced to the cell inside. The cell was maintained in this condition for 10 minutes for cyclopentane to be absorbed into the activated carbon. Weight increase after the absorption was measured, and the absorbed amount in the activated carbon was about 12 wt % per weight of the activated carbon. Next, 1.8 mol/L of TEMABF4/PC electrolyte solution was immersed under a nitrogen atmosphere. Practically, the electrolyte solution was filled, and increase and decrease of pressure was repeated. Initial efficiency of this capacitor of Example 9 was measured in a similar manner as described above. It should be noted that since cyclopentane has a low boiling point and evaporates during decrease of pressure at the immersing process, accurate content of cyclopentane could not be measured.

Preparation of Capacitor Cell (Example 10)

The activated carbon electrode sheet joined with an aluminum collector was dried in a vacuum at 200° C., and the temperature was decreased to 25° C. After that, cyclopentane gas was introduced to a vacuum inside to prepare a negative electrode sheet. Furthermore, except that cyclopentane gas was not introduced, a positive electrode sheet was prepared in a similar manner as for the negative electrode sheet. The two electrode sheets were rolled with the separator in a glove box to prepare a device. A TEMABF4/PC 1.8 mol/L electrolyte solution was immersed into this device while repeating increase and decrease of pressure. After the immersion, the device was put into an aluminum case to prepare a cylindrical cell. Amount absorbed in the activated carbon of the negative electrode was about 12% per weight of activated carbon.

Durability Test

Capacitor cells of Examples 1 to 10 and Comparative Example 1 were put in a constant temperature oven maintained at 45° C., a voltage of 2.7 V was applied to these capacitor cells, and the cells were maintained in this condition for 200 hours to perform a durability test. After the durability test, the temperature of the cells was decreased to 25° C. to measure capacitance. Changed ratio of capacitance after the durability test compared to initial efficiency was calculated by an energy exchange method. The results are shown in Table 1.

TABLE 2-continued

| | Composition ratio of cyclohexane (%) | Composition ratio of cyclopentane (%) | Amount of gas generated ($cm^3$) |
|---|---|---|---|
| Example 5 | — | 5 | 11 |
| Example 6 | — | 10 | 5 |
| Example 7 | — | 30 | 3 |
| Example 8 | — | 40 | 3 |
| Example 9 | — | Immersion after absorption | 5 |
| Example 10 | — | Absorption only in negative electrode | 5 |
| Comparative Example 1 | — | — | 14 |

As is clear in Table 2, gas generation of 14 $cm^3$ was measured in Comparative Example 1, and the small amount of gas generation was measured in Examples 1 to 10. In particular, in the case in which the composition ratio of cyclohexane or cyclopentane was in a range of from 10 to 40 wt %, the gas generation was highly reduced.

TABLE 1

| | Composition ratio (wt %) | | Initial | | After 200 hours | | |
|---|---|---|---|---|---|---|---|
| | Cyclohexane | Cyclopentane | Internal resistance (mΩ) | Capacitance (F) | Internal resistance (mΩ) | Capacitance (F) | Changed ratio of Capacitance (%) |
| Example 1 | 5 | — | 2.9 | 1815 | 3.3 | 1725 | 95 |
| Example 2 | 10 | — | 3.0 | 1800 | 3.5 | 1710 | 95 |
| Example 3 | 30 | — | 3.2 | 1785 | 3.7 | 1714 | 96 |
| Example 4 | 40 | — | 3.4 | 1780 | 3.9 | 1710 | 96 |
| Example 5 | — | 5 | 2.9 | 1770 | 3.2 | 1730 | 95 |
| Example 6 | — | 10 | 2.9 | 1760 | 3.2 | 1672 | 95 |
| Example 7 | — | 30 | 3.1 | 1750 | 3.4 | 1680 | 96 |
| Example 8 | — | 40 | 3.3 | 1745 | 3.6 | 1675 | 96 |
| Example 9 | — | Immersion after absorption | 2.9 | 1760 | 3.2 | 1690 | 96 |
| Example 10 | — | Absorption only in negative electrode | 2.9 | 1765 | 3.2 | 1694 | 96 |
| Comparative Example 1 | — | — | 2.9 | 1810 | 3.5 | 1683 | 93 |

As is clear from Table 1, the changed ratio of capacitance of capacitor cells of Examples 1 to 10 after the durability test is in a range of from 95 to 96% which are desirable results; Comparative Example 1 was 93%.

Measurement of Amount of Gas Generated

Inside pressure of a cell after the durability test was increased by gas generated by decomposition of electrolyte solution. Therefore, a syringe was inserted into the cell and the generated gas was removed until the inside pressure returned to normal pressure. The amount of gas collected in the syringe was defined as the amount of gas generated by decomposition. Table 2 shows the amount of gas generated in Examples 1 to 10 and Comparative Example 1.

TABLE 2

| | Composition ratio of cyclohexane (%) | Composition ratio of cyclopentane (%) | Amount of gas generated ($cm^3$) |
|---|---|---|---|
| Example 1 | 5 | — | 12 |
| Example 2 | 10 | — | 6 |
| Example 3 | 30 | — | 3 |
| Example 4 | 40 | — | 3 |

Examples 11 to 29 and Comparative Examples 2 to 4

Preparation of Electrode

Using mesophase pitch and performing fiber spinning, an aggregation with fibrous material having an average diameter of 14 μm was obtained. By performing carbonating treatment for 1 hour at 700° C. under a nitrogen atmosphere and grinding, graphitizing carbon fiber was obtained. Using potassium hydroxide on this carbon fiber, an alkali activating treatment comprising a primary treatment for 1 hour at 400° C. and a secondary treatment for 5 hours at 800° C. under a nitrogen atmosphere was performed, thorough washing was performed, and a fibrous activated carbon was obtained. Specific surface area of this activated carbon was 790 $m^2$/g, micropore fine pore volume by t-plot method was 0.34 ml/g, the amount of surface functional group by titration method was 0.7 meq/g, the amount of K in the activated carbon was 100 ppm, and the average diameter was 10 μm. This activated carbon, Denkablack (conductive filler), and polytetrafluoroethylene (PTFE, binder) were weighed in a ratio of 90:5:5 and mixed. The mixture is rolled to form an electrode sheet having a forming density of 0.75 g/cm$^3$ and a thickness of 150 µm.

Preparation of Electrolyte Solution (Examples 11 to 16 and Comparative Examples 2 and 3)

Triethylmethylammonium tetrafluoroborate [$(C_2H_5)_3CH_3NBF_4$, TEMABF4] was added to a mixture solvent of propylenecarbonate and ethylenecarbonate to prepare 1.7 mol/L TEMABF4 solutions of Examples 11 to 16. In these solutions of Examples 11 to 16, composition ratio of ethylenecarbonate to the mixture solvent was 0.5 wt %, 1 wt %, 2.5 wt %, 5 wt %, 10 wt %, and 30 wt %, respectively. Furthermore, 1.7 mol/L of TEMABF4 propylene carbonate solution of Comparative Example 2 not having ethylenecarbonate and TEMABF4 solution of Comparative Example 3 in which composition ratio of ethylenecarbonate to the mixture solvent was 50 wt % were prepared.

Preparation of Electrolyte Solution (Examples 17 to 21 and Comparative Example 4)

Triethylmethylammonium tetrafluoroborate [$(C_2H_5)_3CH_3NBF_4$, TEMABF4] was added to a mixture solvent of propylenecarbonate and dimethylcarbonate to prepare 1.7 mol/L TEMABF4 solutions of Examples 17 to 21. In these solutions of Examples 17 to 21, composition ratio of dimethylcarbonate to the mixture solvent is 1 wt %, 2.5 wt %, 5 wt %, 10 wt %, and 30 wt %, respectively. Furthermore, TEMABF4 solution of Comparative Example 4 in which composition ratio of dimethylcarbonate to the mixture solvent was 50 wt % was prepared.

Preparation of Electrolyte Solution (Examples 22 to 25)

TEMABF4 was mixed with a solvent in which ratio of propylenecarbonate:ethylenecarbonate is 97.5:2.5 to prepare a 1.7 mol/L TEMABF4 solution. To this solution, cyclohexane was added to prepare solutions of Examples 22 to 25 in which cyclohexane is contained at 5 wt %, 10 wt %, 20 wt %, and 30 wt %, respectively.

Preparation of Electrolyte Solution (Examples 26 to 29)

TEMABF4 was mixed with a solvent in which ratio of propylenecarbonate:dimethylcarbonate is 95:5 to prepare a 1.7 mol/L TEMABF4 solution. To this solution, cyclohexane was added to prepare solutions of Examples 26 to 29 in which cyclohexane was contained at 5 wt %, 10 wt %, 20 wt %, and 30 wt %, respectively.

Composition ratio of the mix solvent and composition ratio of cyclohexane in the Examples and Comparative Examples are shown in Table 3.

TABLE 3

| | Composition ratio of the mix solvent (wt %) | | | Composition ratio of cyclohexane to |
|---|---|---|---|---|
| | Propylene carbonate | Ethylene carbonate | Dimethyl carbonate | the total amount of solvent (wt %) |
| Comparative Example 2 | 100 | 0 | 0 | 0 |
| Example 11 | 99.5 | 0.5 | 0 | 0 |
| Example 12 | 99 | 1 | 0 | 0 |
| Example 13 | 97.5 | 2.5 | 0 | 0 |
| Example 14 | 95 | 5 | 0 | 0 |
| Example 15 | 90 | 10 | 0 | 0 |
| Example 16 | 70 | 30 | 0 | 0 |
| Comparative Example 3 | 50 | 50 | 0 | 0 |
| Example 17 | 99 | 0 | 1 | 0 |
| Example 18 | 97.5 | 0 | 2.5 | 0 |
| Example 19 | 95 | 0 | 5 | 0 |
| Example 20 | 90 | 0 | 10 | 0 |
| Example 21 | 70 | 0 | 30 | 0 |
| Comparative Example 4 | 50 | 0 | 50 | 0 |
| Example 22 | 97.5 | 2.5 | 0 | 5 |
| Example 23 | 97.5 | 2.5 | 0 | 10 |
| Example 24 | 97.5 | 2.5 | 0 | 20 |
| Example 25 | 97.5 | 2.5 | 0 | 30 |
| Example 26 | 95 | 0 | 5 | 5 |
| Example 27 | 95 | 0 | 5 | 10 |
| Example 28 | 95 | 0 | 5 | 20 |
| Example 29 | 95 | 0 | 5 | 30 |

Preparation of Capacitor Cell

The activated carbon electrode sheets obtained above were arranged on both surfaces of rectangle collector sheets of aluminum foil using a conductive adhesive. In this way, a positive electrode and a negative electrode were prepared, and these electrodes were rolled with a separator to prepare a device. This device was inserted in an Al cylindrical case having a diameter of 40 mm and a length of 120 mm so that no space was formed between the case and the device. A terminal part was welded to seal it, and a capacitor cell was obtained. The capacitor cells were dried in a vacuum at 200° C., the electrolyte solution of Examples and Comparative Examples were filled in these cells through a hole formed on the cells. Then, the reducing of pressure and filling of the electrolyte solution were repeated to immerse the activated carbon electrode in the electrolyte solution sufficiently. After that, an aging treatment of applying a constant voltage of 2.7 V was performed for 6 hours at 65° C. The temperature of the cells was decreased to room temperature, each electrolyte solution was filled in the cells again, the amount of space in the cell was decided to a certain amount, and the hole was sealed by a spill.

Measurement of Initial Efficiency

Constant current discharging of 30 A at 25° C. was performed by an energy exchange method, and initial efficiency (initial capacitance of the capacitor) of each cell was measured. Furthermore, the internal resistance of each cell was measured.

Measurement of Efficiency Changing

Each of the capacitor cells was placed in a constant temperature oven maintained at 65° C., a voltage of 2.7 V was applied to these capacitor cells, and the cells were maintained in this condition for 200 hours to perform a durability test. After the durability test, the temperature of the cells was decreased to 25° C. to measure capacitance. Changed ratio of capacitance after the durability test compared to initial efficiency was calculated by an energy exchange method. The results are shown in Tables 4 to 7.

TABLE 4

|  | Composition ratio of ethylenecarbonate (wt %) | Initial | | After 500 hours | | |
|---|---|---|---|---|---|---|
|  |  | Internal resistance (mΩ) | Capacitance (F) | Internal resistance (mΩ) | Capacitance (F) | Capacitance changing ratio (%) |
| Comparative Example 2 | 0 | 2.6 | 1790 | 3.0 | 1665 | 93 |
| Example 11 | 0.5 | 2.6 | 1790 | 3.0 | 1665 | 93 |
| Example 12 | 1 | 2.4 | 1790 | 2.8 | 1665 | 93 |
| Example 13 | 2.5 | 2.0 | 1785 | 2.3 | 1660 | 93 |
| Example 14 | 5 | 2.0 | 1780 | 2.3 | 1655 | 93 |
| Example 15 | 10 | 2.0 | 1780 | 2.6 | 1655 | 93 |
| Example 16 | 30 | 1.8 | 1750 | 2.4 | 1610 | 92 |
| Comparative Example 3 | 50 | 1.6 | 1782 | 2.4 | 1639 | 92 |

TABLE 5

|  | Composition ratio of dimethylcarbonate (wt %) | Initial | | After 500 hours | | |
|---|---|---|---|---|---|---|
|  |  | Internal resistance (mΩ) | Capacitance (F) | Internal resistance (mΩ) | Capacitance (F) | Capacitance changing ratio (%) |
| Comparative Example 2 | 0 | 2.6 | 1790 | 3.0 | 1665 | 93 |
| Example 17 | 1 | 2.4 | 1790 | 2.8 | 1665 | 93 |
| Example 18 | 2.5 | 2.0 | 1790 | 2.3 | 1665 | 93 |
| Example 19 | 5 | 2.0 | 1780 | 2.3 | 1655 | 93 |
| Example 20 | 10 | 2.1 | 1790 | 2.4 | 1665 | 93 |
| Example 21 | 30 | 2.1 | 1770 | 2.8 | 1628 | 92 |
| Comparative Example 4 | 50 | 2.2 | 1770 | 3.3 | 1628 | 92 |

TABLE 6

|  | Composition ratio of cyclohexane (wt %) | Initial | | After 500 hours | | |
|---|---|---|---|---|---|---|
|  |  | Internal resistance (mΩ) | Capacitance (F) | Internal resistance (mΩ) | Capacitance (F) | Capacitance changing ratio (%) |
| Comparative Example 4 | 0 | 2.0 | 1785 | 2.3 | 1660 | 93 |
| Example 22 | 5 | 2.0 | 1696 | 2.3 | 1560 | 93 |
| Example 23 | 10 | 2.0 | 1678 | 2.3 | 1544 | 93 |
| Example 24 | 20 | 2.1 | 1678 | 2.4 | 1544 | 93 |
| Example 25 | 30 | 2.2 | 1678 | 2.5 | 1544 | 91 |

TABLE 7

|  | Composition ratio of cyclohexane (wt %) | Initial | | After 500 hours | | |
|---|---|---|---|---|---|---|
|  |  | Internal resistance (mΩ) | Capacitance (F) | Internal resistance (mΩ) | Capacitance (F) | Capacitance changing ratio (%) |
| Example 19 | 0 | 2.0 | 1780 | 2.3 | 1655 | 93 |
| Example 26 | 5 | 2.1 | 1691 | 2.4 | 1556 | 93 |
| Example 27 | 10 | 2.1 | 1673 | 2.4 | 1539 | 93 |
| Example 28 | 20 | 2.1 | 1683 | 2.4 | 1548 | 93 |
| Example 29 | 30 | 2.3 | 1673 | 2.6 | 1539 | 91 |

Measurement of Amount of Electrolyte Solution Decomposed

The amount of electrolyte solution decomposed was measured by measuring the amount of gas generated by the decomposition. The amount of gas generated was measured by a method as follows. Internal pressure of the cell after the test was increased by the gas generated, a syringe was inserted into the cell inside, and the gas was collected until the internal pressure returned to normal pressure. The gas collected in the syringe was defined as the gas generated. The results are shown in Tables 8 to 11.

TABLE 8

|  | Composition ratio of ethylenecarbonate (wt %) | Amount of gas generated (cm³) |
|---|---|---|
| Comparative Example 2 | 0 | 9 |
| Example 11 | 0.5 | 8 |

TABLE 8-continued

| | Composition ratio of ethylenecarbonate (wt %) | Amount of gas generated (cm³) |
|---|---|---|
| Example 12 | 1 | 6 |
| Example 13 | 2.5 | 5 |
| Example 14 | 5 | 5 |
| Example 15 | 10 | 5 |
| Example 16 | 30 | 7 |
| Comparative Example 3 | 50 | 11 |

TABLE 9

| | Composition ratio of dimethylcarbonate (wt %) | Amount of gas generated (cm³) |
|---|---|---|
| Comparative Example 2 | 0 | 9 |
| Example 17 | 1 | 7 |
| Example 18 | 2.5 | 4 |
| Example 19 | 5 | 3 |
| Example 20 | 10 | 3.5 |
| Example 21 | 30 | 5 |
| Comparative Example 4 | 50 | 11 |

TABLE 10

| | Composition ratio of dimethylcarbonate (wt %) | Amount of gas generated (cm³) |
|---|---|---|
| Example 4 | 0 | 5 |
| Example 22 | 5 | 4.5 |
| Example 23 | 10 | 2.8 |
| Example 24 | 20 | 1 |
| Example 25 | 30 | 1 |

TABLE 11

| | Composition ratio of dimethylcarbonate (wt %) | Amount of gas generated (cm³) |
|---|---|---|
| Example 19 | 0 | 3 |
| Example 26 | 5 | 2.8 |
| Example 27 | 10 | 1.5 |
| Example 28 | 20 | 0.5 |
| Example 29 | 30 | 0.5 |

Figure 3:
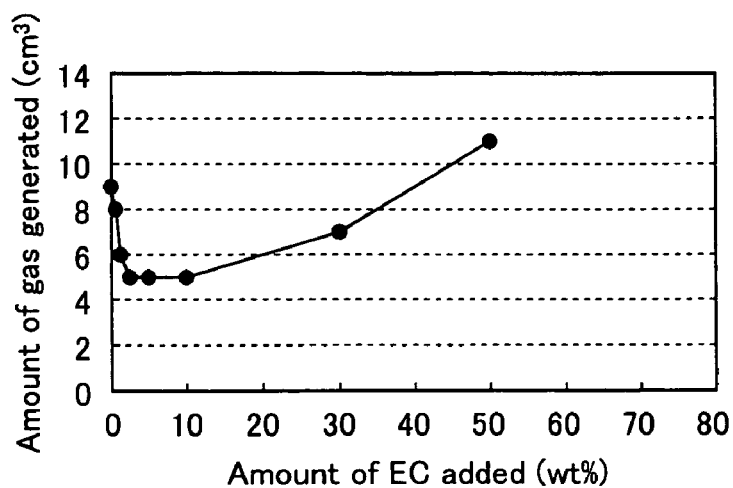
FIG. 3 is a graph showing a relationship of the added amount of ethylenecarbonate and the generated amount of gas in the electrolyte solution of Examples and Comparative Examples of the present invention.
Figure 4:
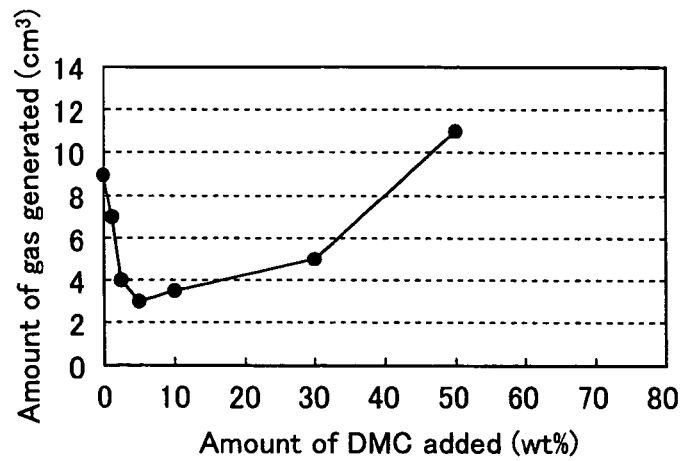
FIG. 4 is a graph showing a relationship of the added amount of dimethylcarbonate and the generated amount of gas in the electrolyte solution of Examples and Comparative Examples of the present invention.
Figure 5:
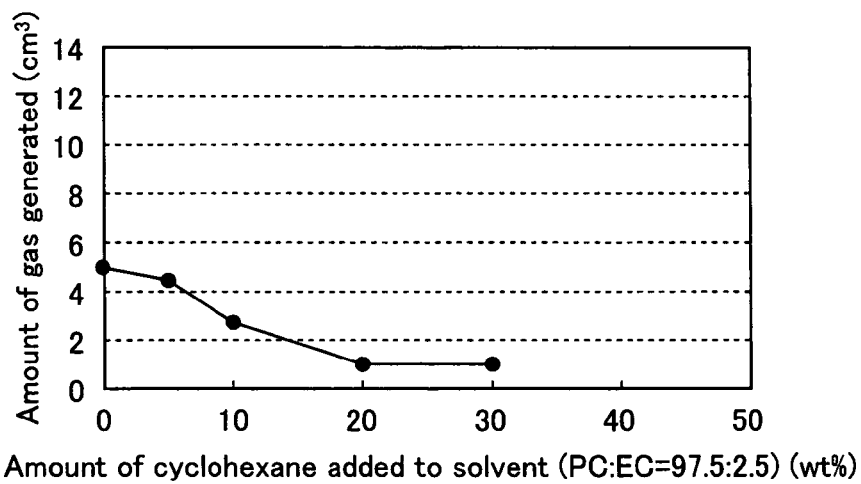
FIG. 5 is a graph showing a relationship of the added amount of cyclohexane to propylenecarbonate/ethylenecarbonate mix electrolyte solution and the generated amount of gas.
Figure 6:
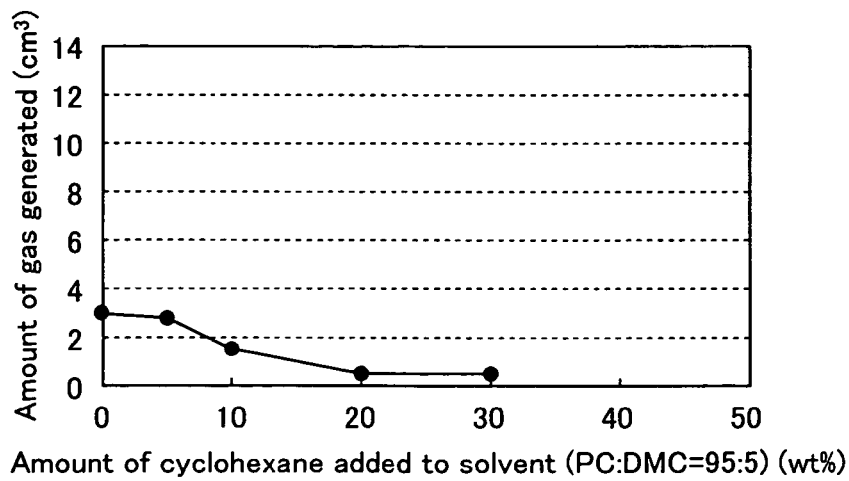
FIG. 6 is a graph showing a relationship of the added amount of cyclohexane to propylenecarbonate/dimethylcarbonate mix electrolyte solution and the generated amount of gas.

Data in Tables 8 to 11 are shown in graphs of FIGS. 3 to 6. As is obvious in these Tables and Figures, by adding ethylenecarbonate, dimethylcarbonate, and further cycloalkane in the range of the present invention to propylenecarbonate which is a conventional electrolyte solution, decomposition of the electrolyte solution can be reduced by up to about 10%.

As is explained above, the electrolyte solution for an electric double layer capacitor of the present invention can reduce internal resistance of the capacitor, and can restrain gas generation due to decomposition of the electrolyte solution. Therefore, an electric double layer capacitor having high energy density and superior reliability can be obtained.

What is claimed is:

1. An electric double layer capacitor comprising a pair of activated carbon electrodes and an organic electrolyte solution in which an electrolyte is dissolved in an organic solvent,
wherein at least one of cycloalkane, cycloalkene, and derivatives thereof is physically absorbed in at least one of the activated carbon electrodes and the organic electrolyte solution.

2. The electric double layer capacitor according to claim 1, wherein the cycloalkane is cyclohexane or cyclopentane.

3. The electric double layer capacitor according to claim 1, wherein at least one of the cycloalkane, the cycloalkene, or derivatives thereof is contained in the organic electrolyte solution in a range of from 10 to 40 wt % of the total weight of the organic solvent.

4. An electric double layer capacitor comprising a pair of activated carbon electrodes and an organic electrolyte solution in which electrolyte is dissolved in an organic solvent,
the organic solvent further comprising a main solvent and an additive solvent,
wherein the main solvent comprises propylencarbonate in a range of from 99.9 to 70 wt % and at least one of ethylenecarbonate and dimethylcarbonate in a range of from 0.1 to 30 wt %, and wherein the additive solvent comprises cycloalkane in a range of from 5 to 30 wt % to the total weight of the solvent.

5. The electric double layer capacitor according to claim 4, wherein the main solvent comprises propylenecarbonate in a range of from 98 to 90 wt % and at least one of ethylenecarbonate and dimethylcarbonate in a range of from 2 to 10 wt %.

6. The electric double layer capacitor according to claim 4, wherein the specific surface area of the activated carbon is in a range of from 100 to 1200 m²/g.

7. An electrolyte solution for an electric double layer capacitor comprising an organic solvent and an electrolyte dissolved in the organic solvent, wherein the electrolyte solution contains at least one of cycloalkane, cycloalkene, and derivatives thereof.

8. An electrolyte solution for an electric double layer capacitor comprising an organic solvent and an electrolyte dissolved in the organic solvent,
the organic solvent further comprising a main solvent and an additive solvent,
wherein the main solvent contains propylenecarbonate in a range of from 99.9 to 70 wt %, and at least one of ethylenecarbonate and dimethylcarbonate in a range of from 0.1 to 30 wt %, and wherein the additive solvent contains cycloalkane in a range of from 5 to 30 wt % to the total weight of the organic solvent.

* * * * *